Oct. 1, 1946.     G. W. PONTIUS, 3D     2,408,680
CHARGER VALVE
Filed Nov. 6, 1941     2 Sheets-Sheet 1

INVENTOR
GEORGE W. PONTIUS III
BY Cecil F Arens
ATTORNEY

Oct. 1, 1946.    G. W. PONTIUS, 3D    2,408,680
CHARGER VALVE
Filed Nov. 6, 1941    2 Sheets-Sheet 2

INVENTOR
GEORGE W. PONTIUS III
BY Cecil J Arens
ATTORNEY

Patented Oct. 1, 1946

2,408,680

UNITED STATES PATENT OFFICE 2,408,680

CHARGER VALVE

George W. Pontius, III, South Bend, Ind.

Application November 6, 1941, Serial No. 417,982

9 Claims. (Cl. 277—7)

This invention relates to improvements in valves, and more particularly in their relation to use in aircraft.

In modern military aircraft where the guns are positioned in the wings remote from the control of the gunner, it is necessary for the gunner to have control over some mechanism which will free the guns when they become jammed. A charger cylinder control mechanism has been described in the copending application of White and Pontius, Serial No. 311,978, now Patent 2,332,419, granted October 19, 1943, whereby freeing of jammed guns may be accomplished. This application is directed to improvements in the control valve disclosed in the above referred to application.

An object of this invention is to provide a construction which will insure against the leakage of fluid under high pressure into or through the valve in its normally closed position.

Another object is to provide an improved valve construction which is operable to control the flow of fluid to a charging cylinder to free a jammed gun.

It is also an object to provide a novel construction for a control valve which will be effective to control the flow of fluid to a gun charging mechanism.

It is a further object to provide a novel arrangement which will better control the entrance of high pressure fluid to the valve.

Yet another object is to provide a novel construction for a valve which will not cause any displacement of fluid therein when the valve is operated.

Still another object comprehends the provision of an arrangement which will permit of rapid and easy adjustment of the valve without disassembly.

A further object is to provide a control valve operable by an aircraft pilot, which will trap liquid in a hydraulic mechanism and which can be manually released. An important feature is a construction which will serve as a safety device for a machine gun to prevent unintended firing.

While this invention has been shown with reference to a preferable embodiment thereof, it is not intended to limit the scope of the invention to the construction or arrangement shown, nor otherwise than by the claims appended to this application.

Figure 1:
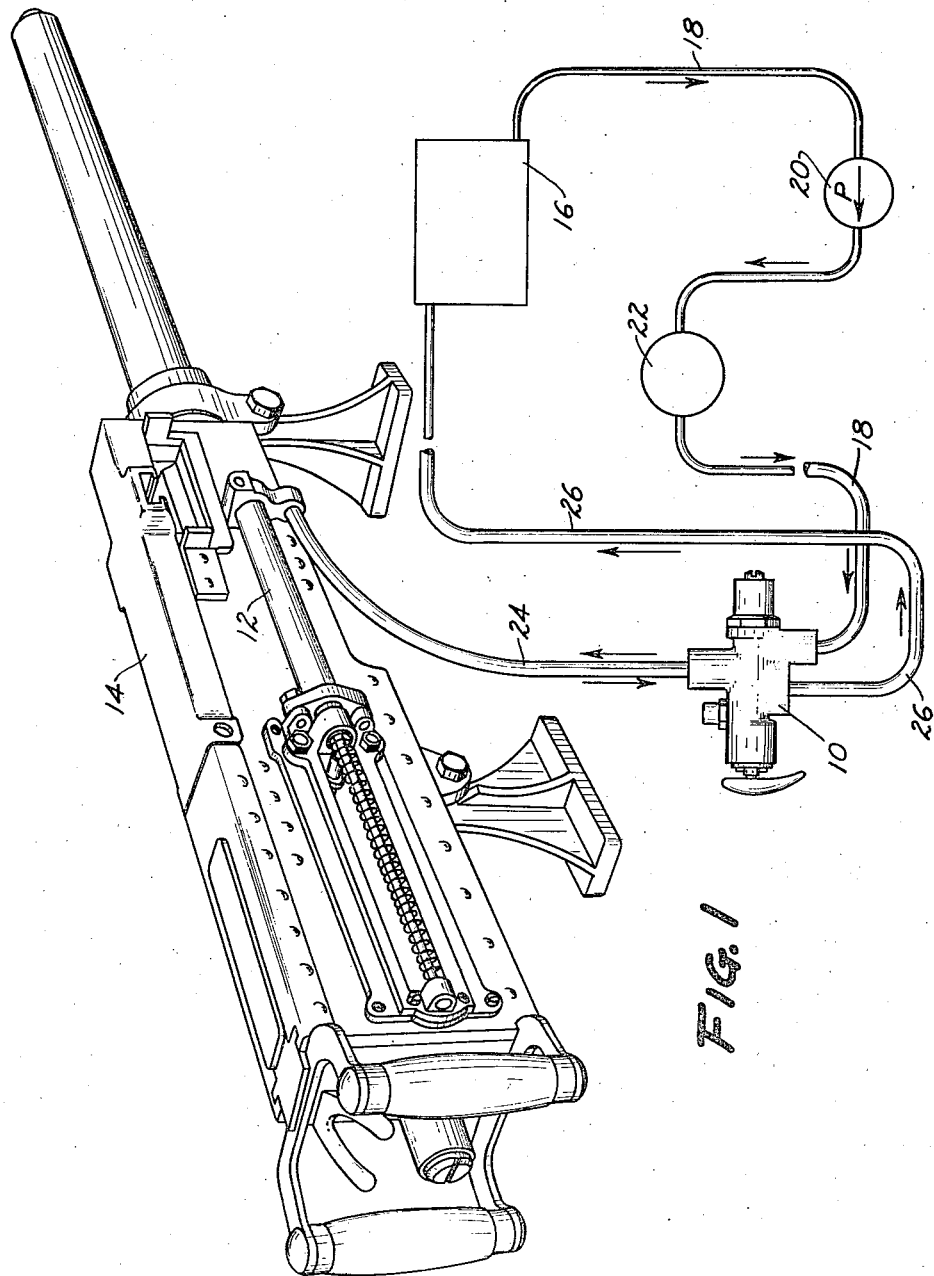
Figure 1 illustrates a machine gun shown in perspective and the associated hydraulic charger system.

With reference to Figure 1 there is shown a layout of the invention as applied to a machine gun charging system. The hydraulic charging system comprises a source of liquid under pressure, a control valve 10 to regulate the flow to a charging cylinder 12, mounted on a machine gun 14. The liquid passes from a reservoir 16 through a conduit 18 to a pump 20, from there to an accumulator 22 and thence to the control valve 10. Flow of the liquid through the system may take a path 24 to the charging cylinder to effect a charging cycle, or a path 26 back to the reservoir 16. The flow of the liquid in the conduit 24 is reversed at the end of the charging cycle and takes a path, not shown, through the valve 10, through the line 26 and back to the reservoir 16.

Figure 2:
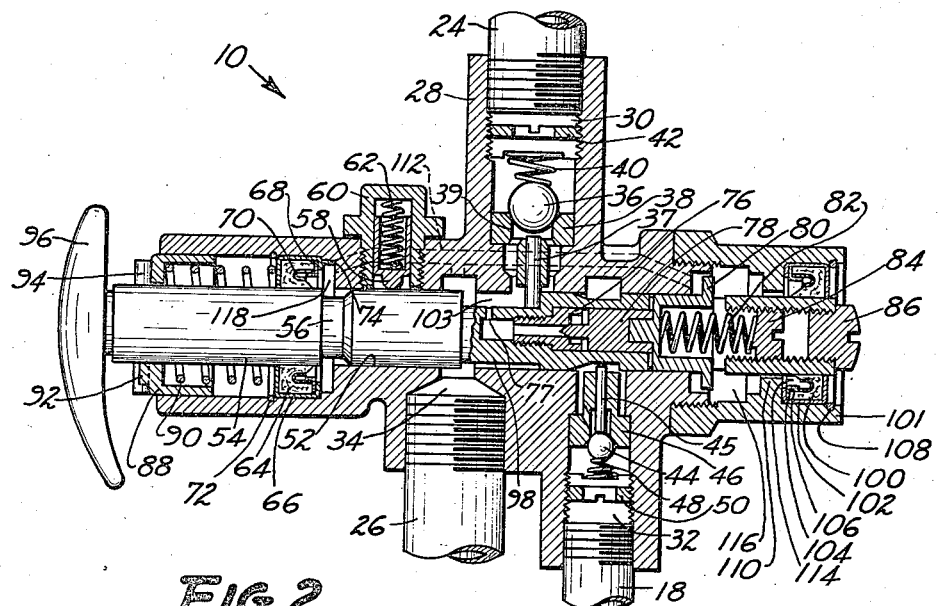
Figure 2 shows in section the control valve forming a part of the subject matter of this application, certain parts thereof being shown in elevation, and the valve being shown in the closed position.

Figure 2 shows the valve 10 in closed and "safe" position, having a body or casing 28 having therein three ports. Port 30 receives conduit 24; port 32 receives conduit 18; and port 34 receives conduit 26. These ports do not communicate freely with the interior of the casing 28, with the exception of port 34. Communication of port 30 with the interior of the casing 28 is obstructed at times by a check valve consisting of a ball 36 which is positioned against a seat 38. Pressure is maintained against the ball 36 by a conical spring 40 held in proper position by a threaded and slotted stop 42, having a passage therein to permit fluid to pass into the conduit 24 or return therefrom. The seat 38 is provided with a passage 39, and a suitable bore carrying push rod 37.

Figure 3:
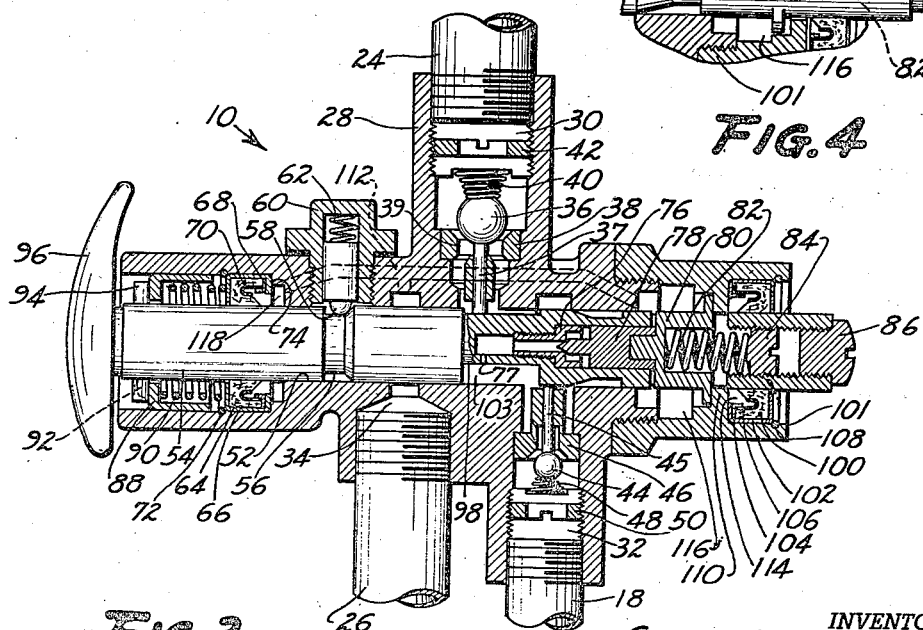
Figure 3 shows in section the control valve which forms a part of the subject matter of this application, certain parts thereof being shown in elevation, and the valve being shown in the open position.

Communication of the port 32 with the interior of the valve casing 28 is controlled by a check valve comprising a ball 44 seated upon a member 46. Pressure is maintained on the ball 44 by a conical spring 48 held in position by a slotted and threaded element 50, having a passage therein to permit fluid to pass from the conduit 18 to the valve body 28. The seat 46 has a passage therein to permit fluid to pass from the port 32 to the valve body 28, and a suitable bore carrying a push rod 45. A tapered portion of the valve member 54 engages the push rod 45 when it moves to the open position as shown in Figure 3 to move the ball check valve 44 off its seat 46.

The casing 28 has a cylindrical bore 52 passing through it along its longitudinal axis, and has circumferential recesses at each port opening in the casing. This cylindrical bore is adapted to receive a cylindrical valve member 54, parts thereof being shown in section, to rotate and slide in the bore 52. The valve member 54 has a detent way 56 therein. A detent 58 is secured to the body 28 by a threaded hollow plug 60 having therein a cylindrical spring 62.

A packing 64 is secured between an element 66 and locking elements 68 and 70. The packing assembly is secured against axial movement by a spring clip 72 and a shoulder 74 in the valve body. Positioned between the elements 66 and a closure 88 is a helical spring 90. The closure 88 carries a stop 92 which engages a pin 94 positioned in a bore in the valve member 54 to limit the rotation of the valve member 54. Valve member 54 carries a control handle 96 which can be attached to the valve member by any suitable means.

A cylindrical recess in the valve member 54 is adapted to receive a needle valve seat 76 having an axial bore as shown which communicates with the interior of the casing 28 through an orifice 77 located in an eccentric portion 98 of the valve member 54. A needle valve 78 is located with reference to valve seat 76 and is restricted in its axial movement by a stirrup 80 and a helical spring 82 which abuts a threaded element 84 secured in the valve member 54. The end of the valve member 54 is closed by a threaded and slotted plug 86.

A housing 101 is threaded to one end of the valve body 28, partially to inclose the valve member 54. In the recess formed by the housing 101 and the protruding end of the valve member 54 is a packing 100, secured between an element 102 and retaining members 104 and 106. The packing assembly is prevented from axial movement by a spring clip 108 and a shoulder 110 in the housing 101.

A passage 112, shown in dotted outline in Figures 2 and 3, is provided to connect the chambers 114 and 116 in the housing 101 to the exhaust port 34 and a chamber 118 formed between the packing 64 and valve body 28. The purpose of this passage is to prevent the building up of fluid pressures from the accumulator 22 against the packings 100 and 64 by exhausting the pressures to the reservoir 16, and to obviate any possibility of blowing out the packings.

The operation of the system as shown in Figure 1 is as follows. Fluid from the reservoir 16 is placed under pressure by means of the pump 20 and passes through the conduit 18 to the accumulator 22. When the gun 14 fails to fire, recharging of the gun is effected by diverting the fluid under pressure through the conduit 24 to the charging cylinder 12 mounted on the gun 14. A suitable passage not shown in this figure, is provided in the control valve 10 for passing the fluid under pressure to the charging cylinder and returning it to the exhaust conduit 26 back to the reservoir 16.

Figure 4:
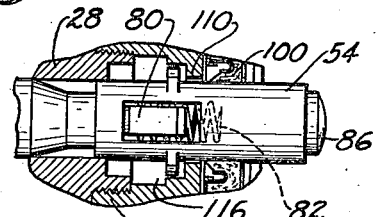
Figure 4 shows a portion of the valve shown in Figures 2 and 3, certain parts thereof being shown in plan view.

The operation of the control valve 10 shown in Figures 2, 3 and 4 is as follows. Referring to Figure 2, the valve is shown in the closed position. When the valve 10 is in this position fluid under high pressure in the conduit 18 cannot flow through the valve past the check valve comprising elements 44, 46, 48 and 50.

To effect a charging cycle the handle 96 is rotated through any angle less than 180°, which is the maximum angular movement permitted by the stop 92 mounted on the end closure 88. Rotation of the handle 96 causes the eccentrically disposed portion 98 of the valve member 54 to take the position shown in Figure 3. The push rod 37 mounted in the check valve seat 38 raises the ball member 36 allowing the charging cylinder 12 to communicate freely with the exhaust conduit 26 through the axial passage 103 in the valve body 28, as shown in Figure 2. In this position the valve is ready for the charging stroke which is effected by pushing the valve member 54 to the right where it takes the position shown in Figure 3. Movement of the valve member 54 causes the push rod 45 located in the valve seat 46 to open the ball check valve 44. It will be seen that movement of the member 54 closes the passage to the conduit 26 preventing the dissipation of pressure in the line 18 to the low pressure line 26. Fluid under pressure will now move through the high pressure line 18 through the valve body 28 past the check valve 36 located in the outlet port 30 and to the charging cylinder 12.

Release of the fluid from the charging cylinder 12 through the conduit 24 and out through the exhaust passage 26 is accomplished as follows. Fluid under high pressure passes the ball check valve 44 to the axial passage 103 and through an orifice 77 disposed in the eccentric portion of the valve member 54. The needle valve 78 is normally set by means of the spring 82 and the adjusting threaded member 84 to open at a pressure to exceed operating pressures of the charging cylinder under any known extremes of operating conditions. The spring 82 is set to require this pressure at the small conical seat 76, but when the valve opens, the pressure will be effective upon the relatively larger area of the needle valve piston 78, transmitting a force through the stop 80 to the shoulder 110 in the housing 101. The reaction thereby produced forces the detent way 56 of the valve plunger 54 out of engagement with the detent 58. Return of the valve member 54 is effected by the compression load in spring 90, but the compression load in the spring 90 is not sufficient to carry the valve member 54 past the detent 58, the reaction against the stop 110 being necessary to effect such movement.

As the valve member 54 returns to its normal position, the ball check valve 44 is again seated, thereby sealing the hydraulic pressure source from the valve 10. The position of the ball check valve 44 will then be as shown in Figure 2. The cylinder port 30 is then open to the exhaust port 34, since the ball check valve 36 located in port 30 is maintained in the open position by the push rod 37 and the eccentric portion 98 of the valve member 54 as shown in Figure 3. It is possible to lock the guns in a safe position by retaining fluid in the charger cylinder 12 under pressure by preventing the escape of the fluid through the valve 10 to the exhaust port 34. The operation of the valve to effect this purpose is best described with reference to Figure 2. Pushing the handle 96 to the right will close port 34 and open ball check valve 44 in port 32. Fluid under pressure will then unseat ball check valve 36 in port 30 to pass the fluid under pressure to the charging cylinder 12. Movement of the valve member 54 to the left is accomplished by the snap action described above.

Since check valve 44 is now closed, and since port 34 is open to the exhaust conduit 26, a differential pressure is set up between conduit 24 and conduit 26, which causes the ball check valve 36 to close upon the seat 38. Fluid under pressure is now trapped in conduit 24 and the bolt retracting mechanism in the charger cylinder 12 is now holding the breech bolt in its retracted position, a position making it impossible to fire the machine gun. The gun cannot be fired until the fluid locked in conduit 24 is exhausted to conduit 26, and the piston located in gun charging cylinder 12 returned to its forward position, thereby freeing the machine gun bolt for counter recoil movement. To exhaust the fluid trapped in line 24 it is only necessary to turn the handle 96 clockwise which raises the push rod 37, unseating check valve 36, to pass the fluid to exhaust port 34.

It will thus be seen that there has been provided a novel and unique construction for a valve which will be operable under extremely high pressure, yet will require small manual effort for actuation. There has also been provided a construction which will insure against building up of excessively high pressures against elements thereof, insuring long life and minimizing danger of destruction to the valve.

There has also been provided a novel arrangement which will be compact and light in weight, two important considerations in connection with use in military aircraft.

Although the valve and system have been described with particular reference to aircraft and to a particular valve structure it is not to be construed that the disclosure is a limiting one, for the elements comprising both the system and the valve may be varied and may depart from the disclosure herein, without deviating from the spirit of the invention. It is to be distinctly understood that the scope of the invention is to be limited only by the claims here appended.

I claim:

1. A remote control valve comprising a casing having an inlet from a source of fluid under pressure and having operating and exhaust outlets, a member movable to connect either the inlet or the exhaust outlet to the operating outlet, a spring urging the member to the position connecting the exhaust outlet to the operating outlet to close the valve, holding means for releasably holding the member in the open position connecting the inlet to the operating outlet, means for automatically overcoming said holding means to permit the valve to close upon increase of the pressure of the fluid within the casing above a predetermined pressure, closed means connected to the outlet to cause such increase of pressure, and means located in the inlet and controlled by the movement of the said member to prevent the entrance of fluid from the source of fluid power to the valve.

2. A remote control valve comprising a casing having an inlet from a source of fluid under pressure and having operating and exhaust outlets, a member movable to connect either the inlet or the exhaust outlet to the operating outlet, a spring urging the member to the position connecting the exhaust outlet to the operating outlet to close the valve, holding means for releasably holding the plunger in the open position connecting the inlet to the operating outlet, and means for automatically overcoming said holding means to permit the valve to close upon increase of fluid pressure within the casing above a predetermined pressure, said means including an adjustable valve unseated by said pressure increase to cause the fluid at its increased pressure to force said member in a direction to release the holding means, closed means connected to the outlet to cause such pressure increase, and means located in the inlet and controlled by the movement of said member to prevent the entrance of fluid from the source of fluid power to the valve.

3. A control valve for fluid actuating mechanisms, comprising a casing containing longitudinally spaced inlet and outlet and exhaust fluid ports, a spring biased valve member slidable longitudinally and rotatable in said casing, said member containing a reduced eccentric portion which allows two ports to communicate, a check valve in the outlet port preventing the return of outgoing fluid, a member placed between the check valve and the eccentric portion of the valve member which is operable to unseat the check valve only when the valve member is rotated, and means disposed in the inlet and controlled only by the longitudinal movement of said valve member to prevent the entrance of fluid to said valve.

4. A control valve for fluid actuating mechanisms, comprising a casing containing longitudinally spaced inlet and outlet and exhaust fluid ports, a valve member slidable longitudinally and rotatable in said casing, said member containing a reduced eccentric portion which allows two ports to communicate, a check valve in the outlet port preventing the return of outgoing fluid, a member placed between the check valve and the eccentric portion of the valve member which is operable to unseat the check valve when the valve member is rotated, means disposed in the inlet and controlled by the longitudinal movement of said valve member to prevent the entrance of fluid to said valve, means automatically operable upon a predetermined fluid pressure to slide the valve member to close the inlet port, and to cause communication between the outlet and the exhaust fluid port, and closed means connected to the outlet to produce such predetermined fluid pressure.

5. A control valve for fluid actuating mechanisms, comprising a casing containing longitudinally spaced inlet and outlet and exhaust fluid ports, a spring biased detent in said casing, a valve member slidable longitudinally and rotatable in said casing, said member containing a reduced eccentric portion which allows two ports to communicate, a detent way disposed circumferentially in said member, a closure at one end of said casing having a stop secured thereto, a pin secured in one end of said valve member and engageable by said stop, so that the eccentric portion is in a position of maximum throw in the axial plane of the outlet port when said pin is engaged by said stop, a check valve in the outlet port preventing the return of outgoing fluid, a member placed between the check valve and the eccentric portion of the valve member which is operable to unseat the check valve, means disposed in the inlet and controlled by the longitudinal movement of said valve member to prevent the entrance of fluid to said valve, means automatically operable upon a predetermined fluid pressure to slide the valve member to close the inlet port, and to cause communication between the outlet and the exhaust fluid port, and closed means connected to the outlet to produce such predetermined fluid pressure.

6. A control valve for fluid actuating mechanisms, comprising a casing containing longitudinally spaced inlet and outlet and exhaust fluid ports, a spring biased detent in said casing, a valve member slidable longitudinally and rotatable in said casing, said member containing a reduced eccentric portion which allows two ports to communicate, a detent way disposed circumferentially in said member, a closure at one end of said casing having a stop secured thereto, a pin secured in one end of said valve member and engageable by said stop, so that the eccentric portion is in a position of maximum throw in the axial plane of the outlet port when said pin is engaged by said stop, a check valve in the outlet port preventing the return of outgoing fluid, a member placed between the check valve and the eccentric portion of the valve member, a smaller diameter concentric portion tapering to the normal diameter of the valve member, a check valve disposed in the inlet port, an operator intermediate the check valve and the smaller diameter concentric portion, said check valve controlled by the longitudinal movement of said tapering portion and the movement of said operator to prevent the entrance of fluid to said valve, an adjustable spring loaded valve located within said valve member, a passage connecting said spring loaded valve to the interior of said valve casing, said spring loaded valve urging the valve member to a position whereby the outlet port and the exhaust port are connected when the pressure within the casing reaches a predetermined value, and closed means connected to the outlet to cause said pressure to reach said value.

7. A control valve for a hydraulic system comprising a body having a bore therein, inlet, cylinder and exhaust ports in the body in communication with the bore, a valve in the inlet port normally closed to the admission of fluid to the bore, a valve member positioned in the bore for axial and rotatable movement, said member being constructed and arranged to open the valve in the inlet port to communicate the inlet port with the cylinder port when said member is moved to one of its axial positions and to permit the valve in the inlet port to close and to communicate the exhaust port with the cylinder port when said member is moved to the other axial position, means for holding the member in said one axial position, means subjected to cylinder port pressure for automatically releasing said member and moving it to the other axial position when the pressure reaches a predetermined maximum value, means operatively connecting the member to the valve in the inlet port for controlling the valve in response to axial movement of the member, and means responsive to rotational movement of the member for exhausting the fluid in the cylinder port.

8. A control valve for a hydraulic system comprising a body having a bore therein, inlet, cylinder and exhaust ports in the body in communication with the bore, a valve in the inlet port normally closed to the admission of fluid to the bore, a valve in the cylinder port normally closed to the return of outgoing fluid, a valve member positioned in the bore for axial and rotatable movement, said member being constructed and arranged to open the valve in the inlet port to communicate the inlet port with the cylinder port when said member is moved to one of its axial positions and to permit the valve in the inlet port to close and to communicate the exhaust port with the cylinder port when said member is moved to the other axial position, means for holding the member in said one axial position, means subjected to cylinder port pressure for automatically moving the member to the other axial position when the pressure reaches a predetermined value, and means operatively connecting the valves in the inlet and cylinder ports to the member for controlling the valves, said member being provided with means for opening the valve in the cylinder port when the member is rotated.

9. A control valve for fluid actuating mechanisms, comprising a casing containing longitudinally spaced inlet and outlet and exhaust fluid ports, a valve member slidable and rotatable in said casing and constructed and arranged to be balanced against fluid pressure acting in the casing, said member containing a reduced, off-center mid-section which allows two ports to communicate, a check valve in the outlet port preventing the return of outgoing fluid, and a member placed between the check valve and the off-center portion of the valve member and which is operable to unseat the check valve when the valve member is rotated.

GEORGE W. PONTIUS, III.